United States Patent [19]
Hendrickx et al.

[11] 3,904,695

[45] Sept. 9, 1975

[54] PREPARATION OF PHLOROGLUCINOL AND ITS MONO-ETHERS

[75] Inventors: Andreas J. J. Hendrickx; Nicolaas A. de Haij, both of Venlo, Netherlands

[73] Assignee: Andeno N.V., Venlo, Netherlands

[22] Filed: June 23, 1972

[21] Appl. No.: 272,928

[30] Foreign Application Priority Data
June 24, 1971 United Kingdom............... 29687/71

[52] U.S. Cl............................ 260/613 D; 260/629
[51] Int. Cl.² .................. C07C 43/20; C07C 37/02
[58] Field of Search........................ 260/629, 613 D

[56] References Cited
UNITED STATES PATENTS
2,593,563 4/1952 Huffman....................... 260/613 D
3,536,767 10/1970 Sommerfield....................... 260/629

FOREIGN PATENTS OR APPLICATIONS
1,588,584 3/1970 France............................... 260/629
1,221,019 2/1971 United Kingdom................. 260/629

*Primary Examiner*—Bernard Helfin
*Attorney, Agent, or Firm*—Albert C. Johnston

[57] ABSTRACT

Phloroglucinol or the mono-methyl ether thereof is prepared at high overall yields, with minimal formation of hazardous or polluting by-products, by reacting phenolic compounds which carry leaving substituents such as one or more halogen atoms, for example, 4-chloro resorcinol, 2,6-dichloro phenol or 2-chloro-4-methoxy phenol, with a proton abstracting agent, e.g., a strong alkali such as KOH, at a temperature between 110° and 180° C in the presence of a small amount of water. The product is readily recovered from the reaction mixture at overall yields as high as 50 to 70%.

16 Claims, No Drawings

PREPARATION OF PHLOROGLUCINOL AND ITS MONO-ETHERS

This invention relates to a new method of preparing s-trihydroxy benzene (phloroglucinol) and its mono-methyl ether.

Phloroglucinol is a well-known and versatile compound. It is used for instance as a coupling agent in the diazotype copying processes and as an intermediate in the preparation of certain drugs. For the latter purpose phloroglucinol ethers are also of interest.

Heretofore, phloroglucinol has been manufactured mainly by oxidation of the hazardous explosive TNT, trinitrotoluene, to 2, 4, 6-trinitrobenzoic acid followed by reduction to the corresponding triamino compound, decarboxylation and hydrolysis. This method suffers from several disadvantages, one of them being the relatively low overall yield, which is due inter alia to the many reaction steps.

Another disadvantage, particularly important nowadays, is that the reaction results in a lot of worthless by-products, some of which indeed may present hazards in terms of public health and/or air, soil and water pollution.

Phloroglucinol mono ethers are generally obtained by reacting phloroglucinol with an etherifying agent such as an alkyl halide, a dialkyl sulfate or an alcohol.

It is an object of the present invention to provide a new and useful method for preparing s-trihydroxy benzene (phloroglucinol) and its mono-methyl ether, which is effective at a minimum of risk of environmental pollution, avoids the use of hazardous explosive TNT as starting material, and affords high overall yields. By avoiding the formation of by-products having no economic value, the method of the present invention affords a more economical production of phloroglucinol and its mono ethers.

Since the oxidation of TNT is usually carried out with a sulfuric acid-dichromate mixture, chromic salts and strong sulfuric acid are important constituents of the waste products, which are formed in great amounts. The method of this invention not only reduces the total amount of waste products to one of the order of one-tenth but it also avoids the formation of sulfuric acid and chromic salts, the two major pollutants produced by the usual method, as by-products. Instead of them, relatively harmless potassium chloride is formed.

The present invention is based on the discovery that resorcinol and resorcinol mono ethers, especially the mono-methyl ether, carrying a leaving group or substituent, such as a halogen atom, in the 4-, 5- or 6-position, will form a 4,5 or 5,6-yne bond, i.e. a triple carbon to carbon bond, when heated (or fused) in the presence of a proton abstracting agent, e.g. a strong alkali, whereupon water will react with the -yne bond product and result in the formation of phloroglucinol or its mono ether.

Instead of the dihydroxy benzene compounds or derivatives thereof mentioned above, monohydroxy benzene compounds also can be converted to phloroglucinol in like manner. The monohydroxy benzene compound however must carry two leaving groups at the right places so they can form two -yne bonds respectively between the C-atoms in the 3- and 5-positions, i.e. meta relative to the hydroxy group, and adjacent C-atoms of the benzene ring. 2,6-dichloro phenol is an example of a suitable monohydroxy compound.

While as a practical matter phloroglucinol is formed from 2,6-dichloro phenol in one reaction step, it can be supposed that 4-chloro resorcinol arises as an intermediate and is converted into phloroglucinol under the reaction conditions. Thus 2,6-dichloro phenol might be considered as a precursor to 4-chloro resorcinol under these conditions. For practical reasons, however, we consider these compounds to be equivalents and consider as precursors all other compounds which upon reaction result in one of these two compounds.

The phenolic compounds reacted according to the invention thus are mono- or di-hydroxy benzene compounds having in the 3-position relative to a hydroxy group on the benzene ring a hydrogen atom, another hydroxy group, an alkyl, ether group, or a leaving group (substituent) that will depart from the compound upon reaction of it with a proton abstracting agent. Further, when the 3-position is occupied otherwise than by a hydrogen atom, such as leaving substituent is present in the 4-, 5- or 6-position; and when the 3-position is occupied by a hydrogen atom, two such leaving substituents are so positioned that two triple bonds can form respectively between the C-atoms at the 3- and 5-positions and carbon atoms adjacent thereto in the ring. Thus, in the latter case, one -yne bond can be formed between the carbon atoms at the 2- and 3- positions or the 3- and 4-positions and another -yne bond can be formed between the carbon atoms at the 4- and 5-positions or the 5- and 6-positions. Of course, the combination of two adjacent -yne bonds between the carbon atoms at the 3-, 4- and 5-positions does not occur, as this is chemically impossible.

Phenolic compounds of this nature which can be used advantageously are those which have a hydroxy group or said ether group in the 3-position and have a leaving substituent in the 4-position. Particularly useful compounds among these have at the 3-position a hydroxy group or an alkoxy group containing 1 to 4 carbon atoms, which desirably is a methylether group. Also advantageous are the mono-hydroxy benzene compounds which have leaving substituents in the two ring positions ortho to the hydroxy group, i.e., in the 2- and 6- positions.

The proton abstracting agent must be sufficiently strong to promote the formation of the -yne bond; so the hydroxides of the alkali metals lithium, sodium and potassium are of first choice. It reacts effectively at a molar ratio to the phenolic compound in the range between 12:1 and 30:1; a molar ratio of between 17:1 and 23:1 appears to be most advantageous.

The heating or fusion is preferably carried out in the presence of a very small amount of water, which may be, for example, about 1–10 ml of water, preferably about 2½ to 5 ml thereof, per 100 g of alkali calculated as KOH.

The heating could be effected at temperatures as high as 300° C, which would be favorable with regard to reaction velocity, but it is preferred to apply relatively moderate temperatures, i.e. temperatures between 110° and 180° C, because aromatic polyhydroxy compounds are readily oxidized in alkaline media at temperatures above 180° C. Preferably the temperature is between 130° and 160° C.

Phloroglucinol is readily produced, and with overall yields of 50–70%, when starting with 4-chloro resorcinol, which is commercially available. To prepare the mono methyl ether, 4-chloro-3-methoxy phenol can be used. Of course the chlorine atom may also be in one of the two other suitable positions, i.e. the 5- or 6-position, and instead of chlorine in the starting material one of the other halogens may be employed. Useful starting materials thus include 4-chloro resorcinol, 5-chloro resorcinol, 4-bromo resorcinol, 5-bromo resorcinol, 4-chloro-3-methoxy phenol, 5-chloro-3-methoxy phenol, 6-chloro-3-methoxy phenol, 4-bromo-3-methoxy phenol, 5-bromo-3-methoxy phenol, and 6-bromo-3-methoxy phenol. As the starting material those compounds are preferred in which a chlorine atom is present in the position ortho to a hydroxyl group.

In another advantageous practice of the invention, phloroglucinol is prepared by heating 2,6-dichloro phenol in the presence of a strong alkali and water. Instead of the 2,6-dichloro compound, the corresponding phenols having other halogen atoms in the 2 and 6 positions can be used, and likewise the halogen atom may be present in other suitable positions such as 2,4 or 2,5 or 3,5. Generally, every compound that upon reaction results in one of the starting materials mentioned above can be used as a precursor.

The following examples, which are not intended to be limiting, further illustrate the practice of the invention.

EXAMPLE I 40 g KOH (pellets) and 1.5 ml of water were heated to 130° C. During 30 minutes, 5.5 g of 4-chloro-1,3-dihydroxybenzene (=4-chloro resorcinol) was added to the melt under vigorous stirring. The stirring was continued during 4 hours at 130° C. and then 50 ml of water was added. The mixture was acidified with 59.5 ml of HCl (s.g. 1.15) and extracted with ethyl acetate. After recrystallization from water phloroglucinol was obtained in 66% yield. It is not essential that water be added to the above mixture for reaction, but it appeared that by using 1–5 mls of added water better results are obtained; the reaction mixture is easier to control yet the overall yield remains high.

EXAMPLES II–III

The same reaction as described in Example I was repeated at different temperatures: at 150°–155° C. and at 170°–175° C., respectively. The corresponding yields were 66% and 60%.

EXAMPLE IV 40 g KOH (pellets) and 1-2 ml of water were heated to 150° C. To the melt 5 g of 2,6-dichloro phenol was added under stirring during approximately 30 minutes. The temperature was raised to 165°–175° C at which temperature the stirring was continued during two hours. Then the reaction mixture was cooled to 100° C. After addition of 50 ml of water the mixture was acidified with 55–60 ml of HCl (s.g. 1.15). Upon extraction with ethyl acetate and further refining, phloroglucinol in a 46% overall yield was obtained. On a second run according to this example the overall yield 49.1%.

EXAMPLE V–VI

In the way described in Example IV phloroglucinol was obtained from each of 3,5- and 2,4-dichloro phenol. The overall yields in these cases were somewhat lower, being approximately 20%.

EXAMPLE VII 40 g KOH (pellets) and 1.5 ml of water were heated to 140°–145°C. During about 60 minutes 6.4 g 2-chloro-5-methoxy phenol was added to the melt under stirring. The stirring was continued during 2 hours at 140°–145°C and then 50 ml of water was added. The mixture was acidified with 60 ml of HCl (s.g. 1.15) to a pH of approximately 5. Another 50 ml of water was added and then the mixture was extracted with di-isopropyl ether. After evaporation of the di-isopropyl ether, 3.0 g of product, corresponding to a 54% yield, resulted. Since the percentage of the monomethyl ether of phloroglucinol in this product was 65% the actual yield in it was 35%. The mother-liquor of about 200 ml appeared to contain 0.5% of the mono methyl ether of phloroglucinol, i.e. about 1 g or 18%. Thus the overall yield of that ether was approximately 53 %. Phloroglucinol itself resulted as by-product in a yield of approximately 22%.

What is claimed is:

1. A method of preparing phloroglucinol, which comprises reacting a mono- or di-hydroxy benzene at a temperature between 110° and 180° C. with alkali metal hydroxide present at a concentration of between 12 and 30 mols of said hydroxide per mol of said benzene in the presence of between 1 and 10 ml. of water per 100 g. of said hydroxide, and acidifying the resulting alkali metal salt to form phloroglucinol, said benzene
   1. having in a 3-position thereof relative to a hydroxy group on the benzene ring a hydrogen atom, another hydroxy group, or a halogen atom selected from the group consisting of chlorine and bromine atoms, and
   2. (a) if said 3-position is occupied by a hydroxy group or a said halogen atom, having a said halogen atom in the 4-, 5-, or 6-position, or
      b. if said 3-position is occupied by a hydrogen atom, having two said halogen atoms in respective positions on said ring each of which is vicinal to at least one hydrogen atom thereon;
   wherein the only substituent present at any position on said ring is a hydroxy group or a said halogen atom.

2. A method according to claim 1, said benzene having in said 3-position a hydroxy group and having a halogen atom in the 4-position.

3. A method according to claim 1, said benzene being a mono-hydroxy benzene having a halogen atom at each of the two ring positions ortho to the hydroxy group.

4. A method according to claim 1, said benzene being 4-chloro resorcinol or 2,6-dichloro phenol.

5. A method according to claim 1, each said halogen atom being a chlorine atom.

6. A method according to claim 1, said temperature lying in the range between 130° and 160° C.

7. A method according to claim 1, said hydroxide being potassium hydroxide.

8. A method according to claim 1, said hydroxide being reacted with said benzene at a molar ratio of between 17:1 and 23:1 thereto.

9. A method of preparing phloroglucinol monomethyl ether, which comprises reacting a mono- hydroxy benzene at a temperature between 110° and 180° C. with alkali metal hydroxide present at a concentration of between 12 and 30 mols of said hydroxide per mol of said benzene in the presence of between 1 and 10 ml. of water per 100 g. of said hydroxide, and acidifying the resulting alkali metal salt to form said ether, said benzene having a methoxy group in a 3-position thereof relative to a hydroxy group on the benzene ring and having in one only of the 4-, 5- and 6-positions on said ring a halogen atom selected from the group consisting of chlorine and bromine atoms; wherein the only substituent present at any position on said ring other than said 3-position is the hydroxy group or said halogen atom.

10. A method according to claim 9, said benzene having in said 3-position a methoxy group and having a halogen atom in the 4-position or the 6-position.

11. A method according to claim 9, said benzene being 2-chloro-5-methoxy phenol.

12. A method according to claim 9, said halogen atom being a chlorine atom.

13. A method according to claim 9, said temperature lying in the range between 130° and 160° C.

14. A method according to claim 9, said hydroxide being potassium hydroxide and being reacted with said benzene at a molar of between 17:1 and 23:1 thereto.

15. A method of preparing phloroglucinol or its mono-methyl ether, which comprises reacting potassium hydroxide with a phenolic compound which, for preparing phloroglucinol, is selected from the group consisting of 4-chloro resorcinol and 2, 6-dichloro phenol or, for preparing said ether, is 2-chloro-5-methoxy phenol, said reacting being effected at a temperature between 130° and 180° C. in the presence of about 2.5 to 5 ml. of water per 100 g. of KOH and with the KOH present in a molar ratio of between 17:1 and 23:1 to the amount of said phenolic compound, and acidifying the resulting alkali metal salt to form phloroglucinol or said ether.

16. A method of preparing phloroglucinol or its mono-methyl ether, which comprises reacting a mono- or di-hydroxy benzene at a temperature between 130° and 160° C. with potassium hydroxide present at a concentration of between 17 and 23 mols of said hydroxide per mol of said benzene in the presence of between 1 and 10 ml. of water per 100 g. of said hydroxide, and acidifying the resulting potassium salt to form phloroglucinol or said ether, said benzene for preparing phloroglucinol being selected from the group consisting of 4-halo, 5-halo, and 6-halo resorcinols and 2,4-, 2,5-, 2,6-, and 3,5-dihalo-phenols, said benzene for preparing said ether being selected from the group consisting of 4-halo-, 5-halo-, and 6-halo-3-methoxy phenols; wherein each halogen atom in said benzene is selected from the group consisting of chlorine and bromine atoms and the only substituent present at any ring position of said benzene is a hydroxy group or a said halogen atom, or a methoxy group when preparing said ether.

* * * * *